Figure 2:
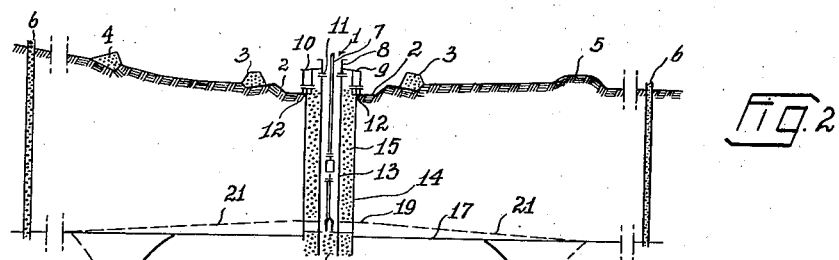
Figure 2:
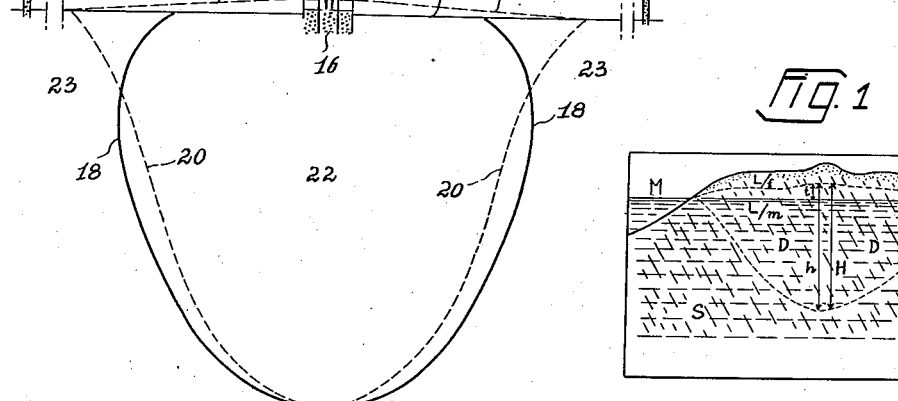

Sept. 2, 1947.  A. DE VITA  2,426,730
PROCESS FOR THE ARTIFICIAL CREATION OF ACCUMULATIONS
OF SUBTERRANEAN COURSES OF WATER
Filed Sept. 11, 1945

INVENTOR
ALBERTO DE VITA
BY *Arthur Baumann*
AGENT

Patented Sept. 2, 1947

2,426,730

UNITED STATES PATENT OFFICE 2,426,730

PROCESS FOR THE ARTIFICIAL CREATION OF ACCUMULATIONS OF SUBTERRANEAN COURSES OF WATER

Alberto De Vita, Buenos Aires, Argentina

Application September 11, 1945, Serial No. 615,575
In Argentina February 26, 1945

6 Claims. (Cl. 61—10)

This invention relates to a process for the artificial creation of accumulations of subterranean courses of chemically potable water in regions where this is lacking. This process has for its object the improvement of extensive regions in which the development of animal and vegetable life, as well as human progress, is hampered by the insufficiency of chemically potable water.

The process object of this invention takes into account the two typical aspects of the above-mentioned insufficiency, that is: the lack of superficial water, together with the unfitness of subterranean waters due to their excess of minerals in solution, and the non-existence of waterbearing strata at economically exploitable depths.

The process characterized by this invention is essentially based on the utilization of rain water towards the following ends:

(a) The creation of pluvial accumulations or subterranean water courses, floating on salt liquid strata.

(b) Improvement in the chemical characteristics (hardness, salinity, fluor content, arsenic, vanadium and other toxic substances) of certain subsoil waters.

(c) The formation of waterbearing strata at economically accessible depths in places where the existing waters are far removed from the surface.

The means adopted to date to lessen the damages arising from the aforementioned insufficiency and defective water, are limited to the installation of aqueducts and, where this is not possible, to the construction of covered receptacles: (cisterns, water-tanks), or uncovered ones: (dams, basins, containers, etc.) meant for the storage of rain water.

In most cases these means fulfill the requirements only relatively for the following reasons:

(a) The reduced capacity of the receptacles limits the quantities of water available.

(b) The decomposition and contamination to which water stored in said manner is subject, do not make its use recommendable.

(c) The high volume reduction of the liquid contained in the uncovered receptacles (due to evaporation), proportionally increases the mineral content of the water, thus making it unfit for human consumption; furthermore, the saline precipitate formed by concentration of the water affects the efficiency of its containers.

(d) The accumulation of insects caused by the presence of stagnant water on the surface is unwholesome for the respective localities, especially those exposed to malaria.

As a means of minimizing the above-mentioned drawbacks, in certain cases the volume of the subterranean waterbearing strata was increased by conducting the river and stream waters into said courses; but this is only one instance of the usual procedures for obtaining water, as in reality these are not regions which are devoid of sweet water.

In other cases, the farmers contrive to make the quality of the subsoil water temporarily usable by mixing it with rain water, which is made to flow into small containers built near to the wells.

The entirely rudimentary nature of these latter constructions, and the fact that they never take into account such basic factors as the technical characteristics of the land in its different levels, and the exploitation system of the wells, reduces their relative efficiency to more or less brief periods of time, after which the subterranean course becomes obstructed with particles borne along by the muddy waters incorporated therein, and the well becomes useless; or, on the contrary, the impermeability of the containers' floors causes the stored liquid, instead of penetrating into the subsoil, to disappear entirely due to evaporation.

The process characterized by the present invention differs substantially from the above-mentioned (which, summarily, comprise all the known processes), because, although it utilizes the product of rainfalls, it does so in a completely new manner, which is strictly related to the granular and structural characteristics of the subsoil, to the principles of physics embodied in the laws of hydrostatics, and to the possibilities envisaged by said characteristics and principles, in order to bring about the creation of artificial courses or subterranean waterbearing strata, or rather, the improvement in quality of the already existing water courses.

In fact, the object is to determine—with the help of means and knowledge supplied by hydrogeology and geophysics—the exact nature and characteristics of that portion of strata and layers which is to be used for the creation of reservoirs or receptacles for atmospheric waters and, based on this and on the possibility of making this reserve water flow into certain parts of the land, to be able to foresee:

(a) The physical characteristics and quantity of liquid which in the shortest possible time and without altering or possibly improving the subsoil capacity, may be stored in the portions being studied.

(b) The distribution in the subsoil of the liquid conveyed as well as of the existing water.

(c) The quality and quantity of water that can be recovered and the most adequate system for its extraction.

In those cases where the subsoil is permeated by salty waters, the above-mentioned process contemplates the creation of sweet water accumulations floating on the salty ones, in a similar manner to what takes place naturally in the islands formed by dunes. This has been pointed out and studied in 1887 and 1901 by Radon Chijben and Herzberg, respectively, both engineers, in accordance with that principle of physical science which says: "The height reached by two non-mixable liquids of different density in communicating glasses is inversely proportional to their respective densities."

The latter author mentioned investigated the details of said phenomenon, especially in the Norderney Island (Oriental Frisia), and established that: "The depth at which displacement of salt water takes place below mean sea level can be determined by multiplying the relation between the density of the sweet water and the difference between the density of the sea water and that of the sweet water, by the height of this latter above sea level."

Figure 1:
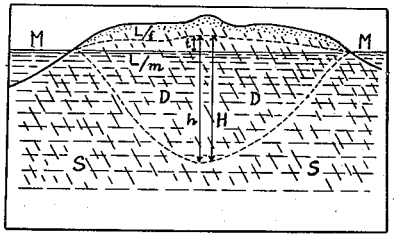

Figure 1 illustrates the observations of said author, the meaning of the letters being as follows:

D, space occupied by sweet water.
S, space occupied by salt water.
M, sea surface.
L/f, phreatic surface of sweet water.
L/m, mean sea level.
t, height of sweet water above mean sea level.
h, depth at which displacement of salt water took place below mean sea level.
H, maximum depth of sweet water.

Supposing the density of sea water is 1.027, and that of sweet water is 1, and that the height $t$ of this latter above sea level is 1.80 then:

$$h = \frac{1}{0.027} \cdot 1.80$$

that is:

$$h = 37 \times 1.80 = 66.60 \text{ meters}$$

This figure was proven to be correct in the aforementioned island by means of borings. Some of these reached a depth of 98 m., and the sweet water limit was found at the 60 m. mark, beneath which the zone of dispersion was encountered, where salt water was present for a width of approximately 5 m.

Evidently, the simplicity of this phenomenon in dune islands whose subsoil may be considered homogeneous, at least up to considerable depths, becomes a complicated matter to study in continental regions where the subsoil is greatly varied and frequently alternated by impermeable strata.

Maybe this is one of the principal reasons for there being little evidence of similar cases which, due to the aforementioned heterogeneous characteristics, often appear in certain regions, but are not so apparent.

In fact, in most cases the roof above the salt waters is a region of cementation, formed by a practically impermeable layer.

This causes the atmospheric waters absorbed by the ground, instead of resting directly above the salt water and inflecting its surface (similar to what occurs in the abovementioned islands), to divide above said layer, thus forming the so-called phreatic layer, which, often being very shallow, is of doubtful use.

In these cases, and in general in all those of a similar nature, the process object of this invention foresees the direct conduction of rain water to the salt water layers, aided by the pressure maintained by water in a filtering column, the height of which is equivalent to the distance between the surface of the ground and the roof of salt water.

Sketched in Figure 2 are some details of the basic constructions entailed by said process, the indications being as follows:

1, an adduction well system for conducting atmospheric waters to the phreatic layers.

2, an annular water settling ditch for sedimentation of the water before its entrance into the adduction well.

3, an annular filter formed by sand, gravel and stone of different gradings, for the purpose of filtering water before its entrance into the settling ditch.

4, a series of straight filtering obstacles, formed like the previous one, for the first filtering of the water, before it reaches the adduction reservoir, in which well 1 is situated.

5, an embankment provided with drains for the purpose of containing the water that flows into the adduction reservoir.

6, a series of bore wells, filled with gravel, to facilitate the escape of air from the subterranean water courses and thus the displacement of the liquid contained in same, during penetration of atmospheric water through well 1.

7, means of extraction to be installed in well 1, for the utilization of water conducted in the subsoil.

8, curb of well 1.
9, curb-apron of said well.
10, annular holding wall.
11, air passages or breathing holes.
12, crevices for the access of water to well 1.
13, revetment or lining of the extraction well.
14, revetment or lining of the adduction well.
15, filter of the adduction well, formed by sand, gravel and stones of different grading.
16, bottom filter of extraction well for the waters to be used; formed by sand, gravel and stones of different grading.
17, roof of the salt water layer and impermeable strata (cementation region).
18, hypothetical section of the surface inflection of the salt water, produced in a homogeneous layer, by the penetration of sweet water through well 1, when the level of said well is at the height indicated by No. 19, and the revetment of the adduction well closes perfectly with impermeable layer 17.
20, hypothetical section of the surface limit between the salt and sweet water when this latter overlaps the cementation region, as indicated by line 21, and escapes through the contact between the adduction well revetment and the impermeable strata 17.
22, space occupied by sweet water and,
23, space occupied by salt water when both liquids are balanced.

Figure 3:
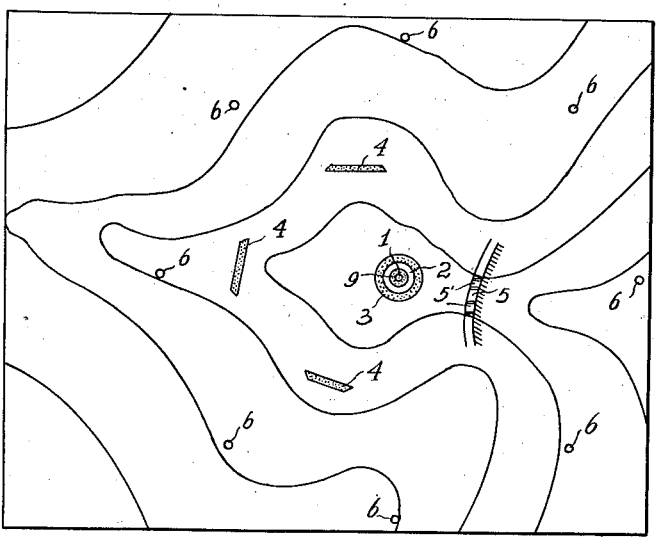

Figure 3 is a bird's-eye view showing distribution of the works referred to in Figure 2.

It is worth mentioning that the section of the separation surface between the salt and the sweet water will change, widening or lessening with the level of the sweet water in the adduction well, while its shape will alter considerably when the thickness of the salt water layer is inferior to that required.

Although the works specified in Figure 2 answer the basic needs of the present process (where cases of salt water are concerned), they may vary as to size, quantity and distribution, according to the subsoil characteristics, availability of atmospheric water and the requirements of each case.

When improvement of the chemical characteristics of subterranean waters is desired (hardness, salinity, fluor content, arsenic, vanadium and other toxic substances), the process referred to may be modified along similar lines to those specified for salt water.

In such cases the improvement will be made by dilution, and instead of obtaining, as in the previous cases a space occupied only by atmospheric water, there will be a space—proportional to the quantity of water adduced—occupied by the water from the natural layer diluted with the atmospheric water.

Figure 4:
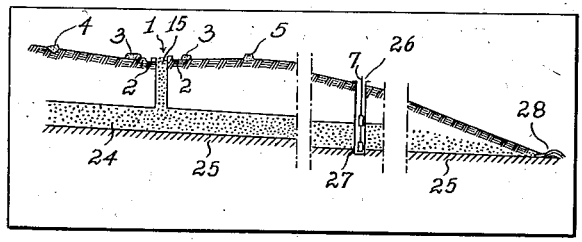

Figure 4 shows the steps of the process in those cases where it is necessary to create subterranean waterbearing strata at economically accessible depths. In said figure references are as follows: 1 is the adduction well, which in these cases can be built simply like an ordinary well, filled in with filtering material 15, but always surrounded by sedimentation ditches 2, filters 3 and 4 and embankment 5, the shapes, quantity, type and position of which may vary, as in the cases previously mentioned.

This well will reach a permeable layer 24 to which it will conduct the atmospheric water, which will drain above the impermeable layer 25, and may be captured downstream at an adequate distance by the extraction well 26, which will reach the impermeable layer and penetrate same through receiving wel 27.

Means of extraction 7 will carry the captured water to the surface.

By this process it will be possible in some cases to create water sources 28 when the impermeable layer 25, at some distance downstream from adduction well 1, reaches or meets the surface.

When permeability of the subsoil is not very great and the layer to which water is conducted is of sufficient depth, once said layer is saturated, it will be easy to obtain volumes of water which, if not abundant, at least may be considered as permanent.

In those cases where said permeability is excessive it can be lessened by conveniently reducing the filtering of waters conducted to the subsoil.

Obviously, several modifications as to construction and specification may be introduced, keeping within the lines of this invention, so long as the variations are within the scope of a fair interpretation of the claims.

I claim:

1. A system for the artificial creation of accumulations of subterranean courses of water of atmospheric origin and chemically potable, comprising an adduction well extending to and reaching the phreatic layers or the permeable strata containing salt water, said permeable strata being superimposed on the impermeable layers, at least one filtering element and at least one containing element surrounding the aforesaid well and forming a settling ditch provided with the corresponding drains, this arrangement being adapted to store water of atmospheric origin in the phreatic layers by displacement of the salt water contained in said phreatic layers.

2. A system for the artificial creation of accumulations of subterranean courses of water of atmospheric origin and chemically potable, comprising an adduction well extending to and reaching the phreatic layers or the permeable strata containing salt water, said permeable strata being superimposed on the impermeable layers, at least one filtering element and at least one containing element surrounding the aforesaid well and forming a settling ditch provided with the corresponding drains, and at least one additional well for the escape of air contained in the subsoil, this arrangement being adapted to store water of atmospheric origin in the phreatic layers by displacement of the salt water contained in said phreatic layers.

3. A system for the artificial creation of accumulations of subterranean courses of water of atmospheric origin and chemically potable, comprising an adduction well extending to and reaching the phreatic layers or the permeable strata containing salt water, said permeable strata being superimposed on the impermeable layers, at least one filtering element and at least one containing element surrounding the aforesaid well and forming a settling ditch provided with the corresponding drains, and at least one liquid extraction means provided downstream from the adduction well, this arrangement being adapted to recover water of atmospheric origin accumulated in the phreatic layers by displacement of the salt water contained in said phreatic layers.

4. A system for the artificial creation of accumulations of subterranean courses of water of atmospheric origin and chemically potable, comprising an adduction well extending to and reaching the phreatic layers or the permeable strata containing salt water, said permeable strata being superimposed on the impermeable layers, at least one filtering element and at least one containing element surrounding the aforesaid well and forming a settling ditch provided with the corresponding drains, and at least one extraction well provided downstream from the adduction well, this arrangement being adapted to recover water of atmospheric origin accumulated in the phreatic layers by displacement of the salt water contained in said phreatic layers.

5. A system for the artificial creation of accumulations of subterranean courses of water of atmospheric origin and chemically potable, comprising an adduction well extending to and reaching the phreatic layers or the permeable strata containing salt water, said permeable strata being superimposed on the impermeable layers, at least one filtering element and at least one containing element surrounding the aforesaid well and forming a settling ditch provided with the corresponding drains, at least one additional well for the escape of air contained in the subsoil, and at least one liquid extraction means provided downstream from the adduction well, this arrangement being adapted to store water of atmospheric origin in the phreatic layers by displacement of the salt water contained in said phreatic layers.

6. A system for the artificial creation of accumulations of subterranean courses of water of atmospheric origin and chemically potable, comprising an adduction well extending to and reaching the phreatic layers or the permeable strata containing chemically non-potable water due to the excess of minerals, hardness or toxic substances, said permeable strata being superimposed on the impermeable layers, at least one filtering element and at least one containing element surrounding the aforesaid well and forming a settling ditch provided with the corresponding drains, this arrangement being adapted to store water of atmospheric origin in the phreatic layers by dilution of the chemically non-potable water contained in said phreatic layers with rain water.

ALBERTO DE VITA.

REFERENCES CITED

The following references are of record in the file of this patent:

UNITED STATES PATENTS

| Number | Name | Date |
|---|---|---|
| 415,543 | Light | Nov. 19, 1889 |
| 1,142,125 | Sooy | June 8, 1915 |
| 1,711,308 | Enderson | Apr. 30, 1929 |
| 2,375,865 | Nebolsine | May 15, 1945 |